United States Patent
Matsumoto et al.

(10) Patent No.: US 10,851,730 B2
(45) Date of Patent: Dec. 1, 2020

(54) ANOMALY DETERMINATION DEVICE AND ANOMALY DETERMINATION METHOD

(71) Applicant: TOYOTA JIDOSHA KABUSHIKI KAISHA, Toyota (JP)

(72) Inventors: Yosuke Matsumoto, Susono (JP); Satoshi Yoshizaki, Toyota (JP); Masahiro Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 16/143,972

(22) Filed: Sep. 27, 2018

(65) Prior Publication Data

US 2019/0162130 A1 May 30, 2019

(30) Foreign Application Priority Data

Nov. 24, 2017 (JP) .................. 2017-225954

(51) Int. Cl.

| F02D 41/22 | (2006.01) |
| F02B 37/18 | (2006.01) |
| F02B 39/16 | (2006.01) |
| F02D 41/00 | (2006.01) |
| F02D 41/08 | (2006.01) |

(52) U.S. Cl.
CPC .......... *F02D 41/221* (2013.01); *F02B 37/186* (2013.01); *F02B 39/16* (2013.01); *F02D 41/0007* (2013.01); *F02D 41/08* (2013.01); *F02D 2041/224* (2013.01); *F02D 2200/021* (2013.01)

(58) Field of Classification Search
CPC .... F02D 41/221; F02D 41/0007; F02D 41/08; F02D 2041/224; F02D 2200/021; F02B 37/186; F02B 39/16
USPC ......................................... 701/114
See application file for complete search history.

(56) References Cited

U.S. PATENT DOCUMENTS

| 2011/0023481 A1* | 2/2011 | Baeuerle | ............... F01D 17/105 60/602 |
| 2012/0001104 A1* | 1/2012 | Shimada | ............... F16K 31/047 251/65 |

(Continued)

FOREIGN PATENT DOCUMENTS

| JP | 2015-025409 A | 2/2015 |
| JP | 2016-079879 A | 5/2016 |

(Continued)

*Primary Examiner* — Mahmoud Gimie
(74) *Attorney, Agent, or Firm* — Oliff PLC

(57) ABSTRACT

An anomaly determination device executes a first anomaly determination process and a second anomaly determination process. The anomaly determination device determines in the first anomaly determination process that an anomaly is present in a link mechanism when a fully-closed-time detection value is outside a closed-side normal range and when a fully-open-time detection value is outside an open-side normal range. The anomaly determination device determines in the second anomaly determination process that an anomaly is present in the link mechanism if the difference between the fully-closed-time detection value and the fully-open-time detection value is outside a normal distance range set in advance when it is not determined in the first anomaly determination process that an anomaly is present in the link mechanism.

6 Claims, 4 Drawing Sheets

(56) References Cited

U.S. PATENT DOCUMENTS

| | | | |
|---|---|---|---|
| 2012/0001111 A1* | 1/2012 | Takeda | F02B 37/186 251/231 |
| 2015/0226111 A1* | 8/2015 | Navarro | F02B 37/186 60/602 |
| 2016/0108803 A1* | 4/2016 | Ono | F02D 41/221 60/602 |
| 2017/0370498 A1* | 12/2017 | Kawamura | F02D 13/02 |
| 2018/0041156 A1* | 2/2018 | Kawamura | B60L 15/20 |
| 2018/0283263 A1 | 10/2018 | Iijima et al. | |

FOREIGN PATENT DOCUMENTS

| | | |
|---|---|---|
| WO | 2016/162924 A1 | 10/2016 |
| WO | 2017/051465 A1 | 3/2017 |

* cited by examiner

ANOMALY DETERMINATION DEVICE AND ANOMALY DETERMINATION METHOD

BACKGROUND

The present disclosure relates to an anomaly determination device and an anomaly determination method.

The turbine housing of the turbocharger disclosed in Japanese Laid-Open Patent Publication No. 2016-079879 includes a scroll passage and an exhaust passage, in which exhaust gas from the scroll passage flows. A turbine wheel is housed in the scroll passage. The exhaust gas flowing in the scroll passage rotates the turbine wheel. The turbine housing includes a bypass passage. The bypass passage connects a section of the scroll passage upstream of the turbine wheel to the exhaust passage. A wastegate configured to open and close the bypass passage is housed in the turbine housing. The wastegate is coupled via a coupling mechanism to an electric actuator. When the actuator is driven, the wastegate opens and closes the bypass passage. When the bypass passage is fully closed, the wastegate abuts against a valve seat in the turbine housing. The turbocharger described above includes a sensor configured to detect the position of the output shaft in the actuator.

The turbocharger described above uses an anomaly determination device that determines whether an anomaly is present in mechanical connections of the wastegate, the coupling mechanism, and the actuator. The anomaly determination device detects a detection value of the sensor when the actuator is driven to cause the wastegate to abut against the valve seat as a fully-closed-time detection value. The anomaly determination device compares the fully-closed-time detection value to a comparison value set in advance. When the fully-closed-time detection value significantly deviates from the comparison value, the anomaly determination device determines that an anomaly is present in the mechanical connections of the coupling mechanism and the like.

In the anomaly determination device described above, detection values of the sensor vary depending on wear of the coupling mechanism or the like, thermal expansion of the coupling mechanism or the like, and detection error of the sensor. Consequently, it is sometimes determined that an anomaly is present, although the mechanical connections of the coupling mechanism and the like are normal. In other cases, it is determined to be normal, although an anomaly is present in the mechanical connections.

SUMMARY

In accordance with a first aspect of the present disclosure, an anomaly determination device for use with a turbocharger is provided. The turbocharger includes a turbine housing, a wastegate, an electric actuator, a coupling mechanism, a stopper, a sensor, a control unit, and an anomaly determination unit. The turbine housing includes a scroll passage, in which a turbine wheel configured to be rotated by exhaust gas is housed, a discharge passage, which is connected to the scroll passage and in which exhaust gas from the scroll passage flows, and a bypass passage, which connects a section of the scroll passage upstream of the turbine wheel to the discharge passage. The wastegate abuts against a valve seat provided in the turbine housing when the bypass passage is fully closed. The electric actuator is configured to drive the wastegate. The coupling mechanism couples the wastegate to the actuator. The stopper abuts against the wastegate or the coupling mechanism when the bypass passage is fully open to restrict a movement of the wastegate to an open position. The sensor detects a position of an output shaft of the actuator. The control unit controls energization of the actuator. The anomaly determination unit, which determines whether an anomaly is present in the coupling mechanism based on a detection value detected by the sensor. The anomaly determination unit is configured to execute: a first anomaly determination process for determining that an anomaly is present in the coupling mechanism when at least one of two conditions is met, the conditions being a condition that a fully-closed-time detection value is outside a closed-side normal range set in advance and a condition that an fully-open-time detection value is outside an open-side normal range set in advance; and a second anomaly determination process for determining that an anomaly is present in the coupling mechanism if a difference between the fully-closed-time detection value and the fully-open-time detection value is outside a normal distance range set in advance when it is not determined in the first anomaly determination process that an anomaly is present in the coupling mechanism. The fully-closed-time detection value is a detection value of the sensor when the control unit energizes the actuator to cause the wastegate to abut against the valve seat. The fully-open-time detection value is a detection value of the sensor when the control unit energizes the actuator to cause the wastegate to abut against the stopper.

In accordance with a second aspect of the present disclosure, an anomaly determination device for use with a turbocharger is provided. The turbocharger includes a turbine housing, a wastegate, an electric actuator, a coupling mechanism, a stopper, a sensor, a control unit, and an anomaly determination unit. The turbine housing includes a scroll passage, in which a turbine wheel configured to be rotated by exhaust gas is housed, a discharge passage, which is connected to the scroll passage and in which exhaust gas from the scroll passage flows, and a bypass passage, which connects a section of the scroll passage upstream of the turbine wheel to the discharge passage. The wastegate abuts against a valve seat provided in the turbine housing when the bypass passage is fully closed. The electric actuator is configured to drive the wastegate. The coupling mechanism couples the wastegate to the actuator. The stopper abuts against the wastegate or the coupling mechanism when the bypass passage is fully open to restrict a movement of the wastegate to an open position. The sensor detects a position of an output shaft of the actuator. The control unit controls energization of the actuator. The anomaly determination unit determines whether an anomaly is present in the coupling mechanism based on a detection value detected by the sensor. The anomaly determination unit includes circuitry that is configured to execute: a first anomaly determination process for determining that an anomaly is present in the coupling mechanism when at least one of two conditions is met, the conditions being a condition that a fully-closed-time detection value is outside a closed-side normal range set in advance and a condition that an fully-open-time detection value is outside an open-side normal range set in advance; and a second anomaly determination process for determining that an anomaly is present in the coupling mechanism if a difference between the fully-closed-time detection value and the fully-open-time detection value is outside a normal distance range set in advance when it is not determined in the first anomaly determination process that an anomaly is present in the coupling mechanism. The fully-closed-time detection value is a detection value of the sensor when the control unit energizes the actuator to cause the wastegate to abut against the valve seat. The fully-open-time detection value is a detection value of the sensor when the control unit energizes the actuator to cause the wastegate to abut against the stopper.

In accordance with a third aspect of the present disclosure, an anomaly determination method for a turbocharger is provided. The turbocharger includes a turbine housing, a wastegate, an electric actuator, a coupling mechanism, a stopper, a sensor, a control unit, an anomaly determination unit. The turbine housing includes a scroll passage, in which a turbine wheel configured to be rotated by exhaust gas is housed, a discharge passage, which is connected to the scroll passage and in which exhaust gas from the scroll passage flows, and a bypass passage, which connects a section of the scroll passage upstream of the turbine wheel to the discharge passage. The wastegate abuts against a valve seat provided in the turbine housing when the bypass passage is fully closed. The electric actuator configured to drive the wastegate. The coupling mechanism couples the wastegate to the actuator. The stopper abuts against the wastegate or the coupling mechanism when the bypass passage is fully open to restrict a movement of the wastegate to an open position. The sensor detects a position of an output shaft of the actuator. The control unit controls energization of the actuator. The anomaly determination unit, which determines whether an anomaly is present in the coupling mechanism based on a detection value detected by the sensor. The anomaly determination method comprising using the anomaly determination unit to execute: a first anomaly determination process for determining that an anomaly is present in the coupling mechanism when at least one of two conditions is met, the conditions being a condition that a fully-closed-time detection value is outside a closed-side normal range set in advance and a condition that an fully-open-time detection value is outside an open-side normal range set in advance; and a second anomaly determination process for determining that an anomaly is present in the coupling mechanism if a difference between the fully-closed-time detection value and the fully-open-time detection value is outside a normal distance range set in advance when it is not determined in the first anomaly determination process that an anomaly is present in the coupling mechanism. The fully-closed-time detection value is a detection value of the sensor when the control unit energizes the actuator to cause the wastegate to abut against the valve seat. The fully-open-time detection value is a detection value of the sensor when the control unit energizes the actuator to cause the wastegate to abut against the stopper.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

One embodiment of the present disclosure will now be described with reference to FIGS. 1 to 5. First, a schematic configuration of an internal combustion engine 100 to which the present disclosure is applied will be described.

Figure 1:
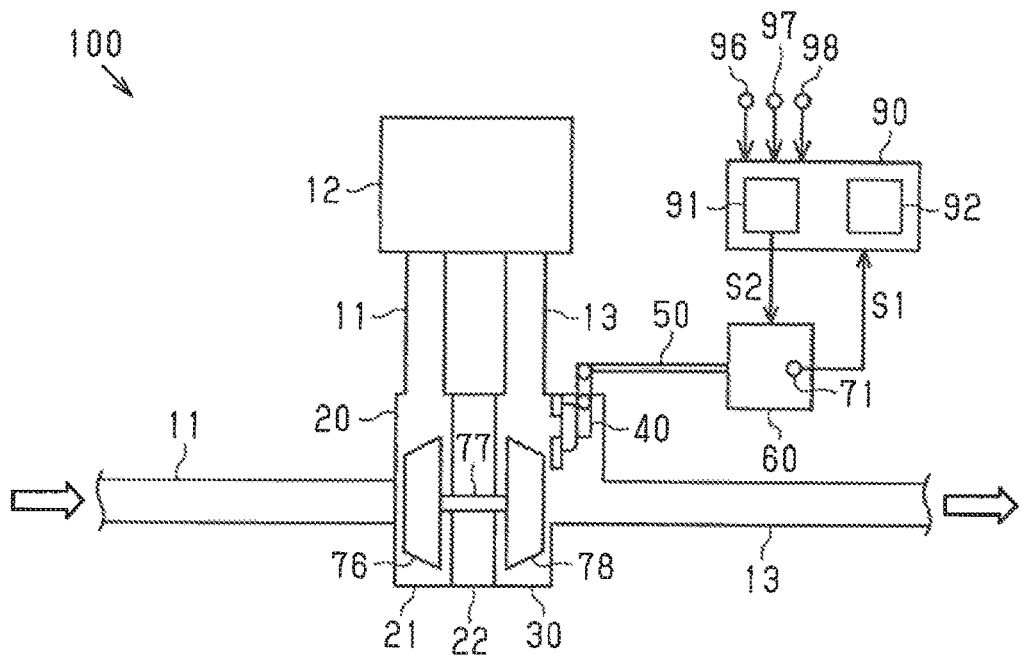
FIG. 1 is a schematic diagram of an internal combustion engine and a controller.

As shown in FIG. 1, the internal combustion engine 100 includes an intake passage 11, in which intake air taken from outside flows. The intake passage 11 is connected to a cylinder 12, in which fuel and intake air are mixed and combusted. The cylinder 12 is connected to an exhaust passage 13, in which exhaust air flows.

The internal combustion engine 100 includes a turbocharger 20, which compresses intake air using a flow of exhaust gas. The turbocharger 20 includes a compressor housing 21 attached to the intake passage 11. The turbocharger 20 also includes a turbine housing 30 attached to the exhaust passage 13. The compressor housing 21 is connected via a bearing housing 22 provided in the turbocharger 20 to the turbine housing 30.

A turbine wheel 78, which is rotated by the flow of exhaust gas, is housed in the turbine housing 30. The turbine wheel 78 is connected to a first end of a coupling shaft 77. A center portion of the coupling shaft 77 is housed in the bearing housing 22. The coupling shaft 77 is rotationally supported by a bearing (not shown) disposed in the bearing housing 22. A compressor wheel 76 is connected to a second end of the coupling shaft 77. The compressor wheel 76 is housed in the compressor housing 21.

Next, the turbine housing 30 and its related configuration are specifically described.

Figure 2:
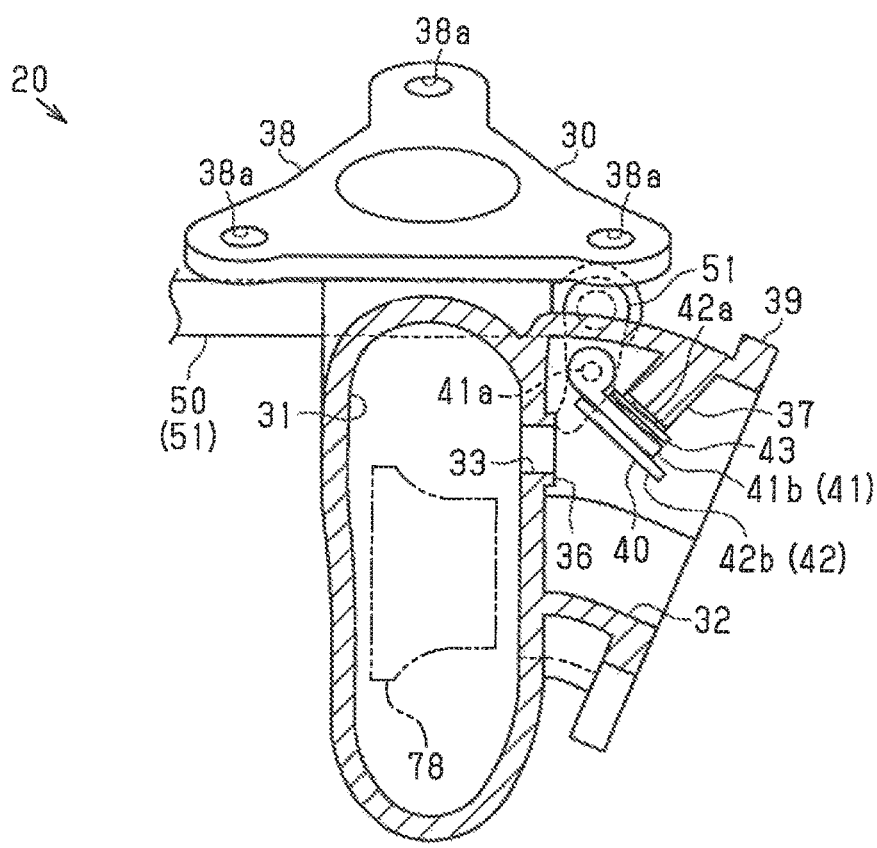
FIG. 2 is a cross-sectional view of a turbine housing of a turbocharger.

As shown in FIG. 2, the turbine housing 30 includes a scroll passage 31, in which exhaust gas flows. The turbine wheel 78 is housed in the scroll passage 31. The scroll passage 31 is provided so as to surround the turbine wheel 78, and extends circumferentially around the rotation axis of the turbine wheel 78, that is, the rotation axis of the coupling shaft 77.

The turbine housing 30 includes an upstream flange 38 extending outward from the upstream end of the scroll passage 31. The upstream flange 38 includes a plurality of bolt holes 38a. The bolt holes 38a pass through the upstream flange 38 in its thickness direction. The turbine housing 30 is connected to a section of the exhaust passage 13 upstream of the turbine housing 30 by bolts (not shown) inserted into the bolt holes 38a.

The turbine housing 30 includes a discharge passage 32, in which exhaust gas from the scroll passage 31 flows. The discharge passage 32 is connected to a downstream end of the scroll passage 31. The discharge passage 32 extends substantially in the direction of the rotation axis of the turbine wheel 78. The turbine housing 30 includes a downstream flange 39 extending outward from a downstream end of the discharge passage 32. The turbine housing 30 is connected to a section of the exhaust passage 13 downstream of the turbine housing 30 by bolts inserted into bolt holes (not shown) in the downstream flange 39.

Exhaust gas passes through the scroll passage 31 in the turbine housing 30 to blow on the turbine wheel 78. The exhaust gas then passes through the discharge passage 32 in the turbine housing 30 to be discharged to a section of the exhaust passage 13 downstream of the turbine housing 30. The exhaust gas having passed through the scroll passage 31 blows on the turbine wheel 78, thus rotating the turbine wheel 78. As the turbine wheel 78 rotates to rotate the compressor wheel 76 with the coupling shaft 77, intake air is supercharged.

The turbine housing 30 includes a bypass passage 33, which connects a section of the scroll passage 31 upstream of the turbine wheel 78 to the discharge passage 32. The bypass passage 33 is formed as a hole with a substantially circular cross-section, and passes through a wall that partitions the scroll passage 31 and the discharge passage 32 from each other.

A substantially annular valve seat 36 is provided in the discharge passage 32 in the turbine housing 30. The valve seat 36 projects from the wall that partitions the scroll passage 31 and the discharge passage 32 from each other toward the downstream of the discharge passage 32. The valve seat 36 is provided so as to surround an opening in the bypass passage 33 near the discharge passage 32. A substantially columnar stopper 37 is provided in the discharge passage 32 in the turbine housing 30. The stopper 37 projects from a wall surface of the turbine housing 30 that defines the discharge passage 32 toward the valve seat 36.

A swing arm 41 of a wastegate 40 configured to open and close the bypass passage 33 is attached to the turbine housing 30. The swing arm 41 includes a substantially columnar shaft 41a, which passes through the wall of the turbine housing 30. The swing arm 41 also includes a substantially plate-shaped fixing part 41b, which extends from the shaft 41a to the inside of the turbine housing 30. The shaft 41a is supported by the wall of the turbine housing 30 to be rotational about the axis of the shaft 41a. An insertion hole is provided in the substantially center portion of the fixing part 41b. A valve 42 is fixed in the insertion hole. The valve 42 includes a substantially columnar valve shaft 42a, which is inserted into the insertion hole in the fixing part 41b of the swing arm 41, and a substantially disk-shaped valve body 42b, which extends from a distal end of the valve shaft 42a. A support plate 43 is fixed to a proximal end of the valve shaft 42a.

As shown in FIG. 2, the end of the shaft 41a that is placed outside the turbine housing 30 is coupled to a link mechanism 50 functioning as a coupling mechanism. As shown in FIG. 1, the link mechanism 50 is coupled to an actuator 60, which is the drive source for opening and closing the wastegate 40.

Figure 3:
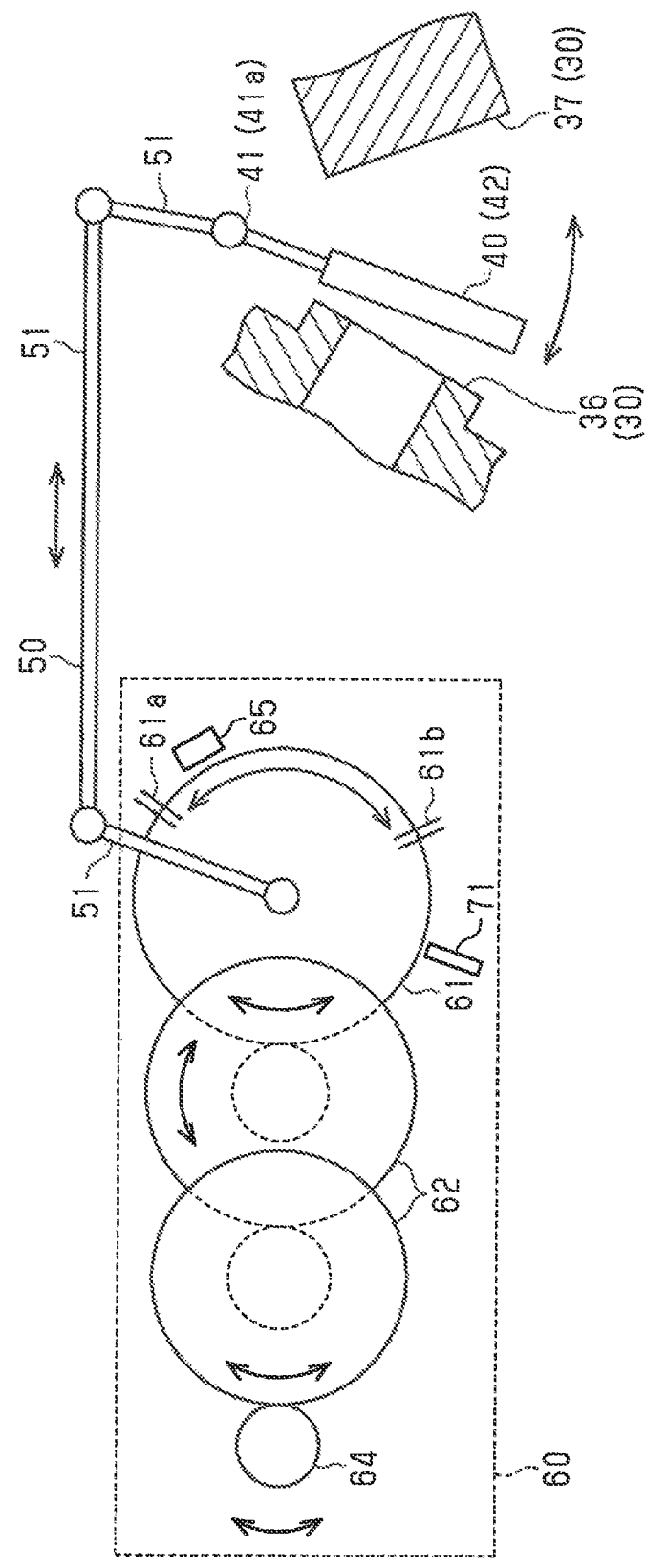
FIG. 3 is a conceptual diagram of a connection state of a wastegate, a link mechanism, and an actuator.

As shown in FIG. 3, the actuator 60 includes an electric motor 64, two reduction gears 62, which decelerate and transmit rotation of the output shaft of the electric motor 64, and an output gear 61, which outputs rotation input from the reduction gears 62 to the link mechanism 50. A closed-side stopper 61a and an open-side stopper 61b configured to restrict the rotation of the output gear 61 are fixed to the output gear 61. The closed-side stopper 61a and the open-side stopper 61b each are formed as, for example, a projection that projects radially outward from the outer circumferential part of the output gear 61.

The actuator 60 includes an internal stopper 65 configured to abut against one of the closed-side stopper 61a and the open-side stopper 61b of the output gear 61 to restrict the rotation of the output gear 61. The internal stopper 65 is formed as, for example, a projection that projects from an inner wall of a case of the actuator 60. The internal stopper 65 is disposed between the closed-side stopper 61a and the open-side stopper 61b in the circumferential direction of the output gear 61. When the output gear 61 is rotated in a direction that the wastegate 40 closes the bypass passage 33, the closed-side stopper 61a abuts against the internal stopper 65. When the output gear 61 is rotated in a direction that the wastegate 40 opens the bypass passage 33, the open-side stopper 61b abuts against the internal stopper 65.

The output gear 61 is coupled to the link mechanism 50. The link mechanism 50 is constituted by three link members 51. The link mechanism 50 converts the rotation of the output gear 61 into an open-close operation of the swing arm 41 of the wastegate 40 for transmission.

The rotational range of the output gear 61 restricted by the internal stopper 65 is larger than the rotation range of the output gear 61 when the wastegate 40 is driven from the fully-closed state to the fully-open state. Consequently, when the wastegate 40 and the link members 51 of the link mechanism 50 are coupled normally to each other, the closed-side stopper 61a and the open-side stopper 61b do not abut against the internal stopper 65. In contrast, if any of the wastegate 40 and the link members 51 of the link mechanism 50 is disconnected and thus an anomaly is present in mechanical connections of the members, the closed-side stopper 61a and the open-side stopper 61b may abut against the internal stopper 65. That is, when the wastegate 40 and the link members 51 of the link mechanism 50 are coupled normally to each other, the wastegate 40 abuts against the valve seat 36 to restrict movement toward the closed-side or abuts against the stopper 37 to restrict movement toward the open side.

As shown in FIG. 3, a sensor 71 configured to detect the rotational position of the output gear 61 is attached to the actuator 60. The sensor 71 detects a detection voltage S1, which is a voltage value changing depending on the rotational position of the output gear 61 functioning as the output shaft of the actuator 60. As the rotational position of the output gear 61 approaches the rotational position corresponding to the closed position of the wastegate 40, the detection voltage S1 becomes higher. Additionally, as the rotational position of the output gear 61 approaches the rotational position corresponding to the open position of the wastegate 40, the detection voltage S1 becomes lower. As described above, the output gear 61 is coupled via the link mechanism 50 to the wastegate 40. For this reason, when the mechanical connections of the link mechanism 50 and the wastegate 40 are normal, the detection voltage S1 reflects the open-close position of the wastegate 40. It is thus possible to estimate the open-close position of the wastegate 40 based on the detection voltage S1 detected by the sensor 71.

As shown in FIG. 1, a signal indicating the detection voltage S1 detected by the sensor 71 is input to a controller 90, which functions as an anomaly determination device. The controller 90 includes a control unit 91, which controls energization of the actuator 60, and an anomaly determination unit 92, which determines whether an anomaly is present in the link mechanism 50. The control unit 91 outputs a control signal S2 for controlling the open-close operation of the wastegate 40 to the actuator 60 based on the operation state of the internal combustion engine 100. The anomaly determination unit 92 determines whether an anomaly is present in the mechanical connections of the wastegate 40, the link mechanism 50, and the actuator 60 based on the detection voltage S1 and the control signal S2.

The controller 90 is not limited to one that performs software processing on all processes executed by itself. For example, the controller 90 may include at least part of the processes executed by the software in the present embodiment as one that is executed by hardware circuits dedicated to execution of these processes (such as ASIC). That is, controller 90 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

A signal indicating a rotational speed of a crankshaft detected by a crank angle sensor 96 is input to the controller 90. A signal indicating a depressing amount of an accelerator pedal detected by an accelerator sensor 97 is input to the controller 90. In addition, a signal indicating a temperature of coolant of the internal combustion engine 100 detected by a water temperature sensor 98 is input to the controller 90. The water temperature sensor 98 detects the temperature of an exit of a water jacket for a cylinder block or a cylinder head as the temperature of coolant of the internal combustion engine 100.

Next, relationships between the open-close operation of the wastegate 40 and the detection voltage S1 detected by the sensor 71 are described.

Figure 4:
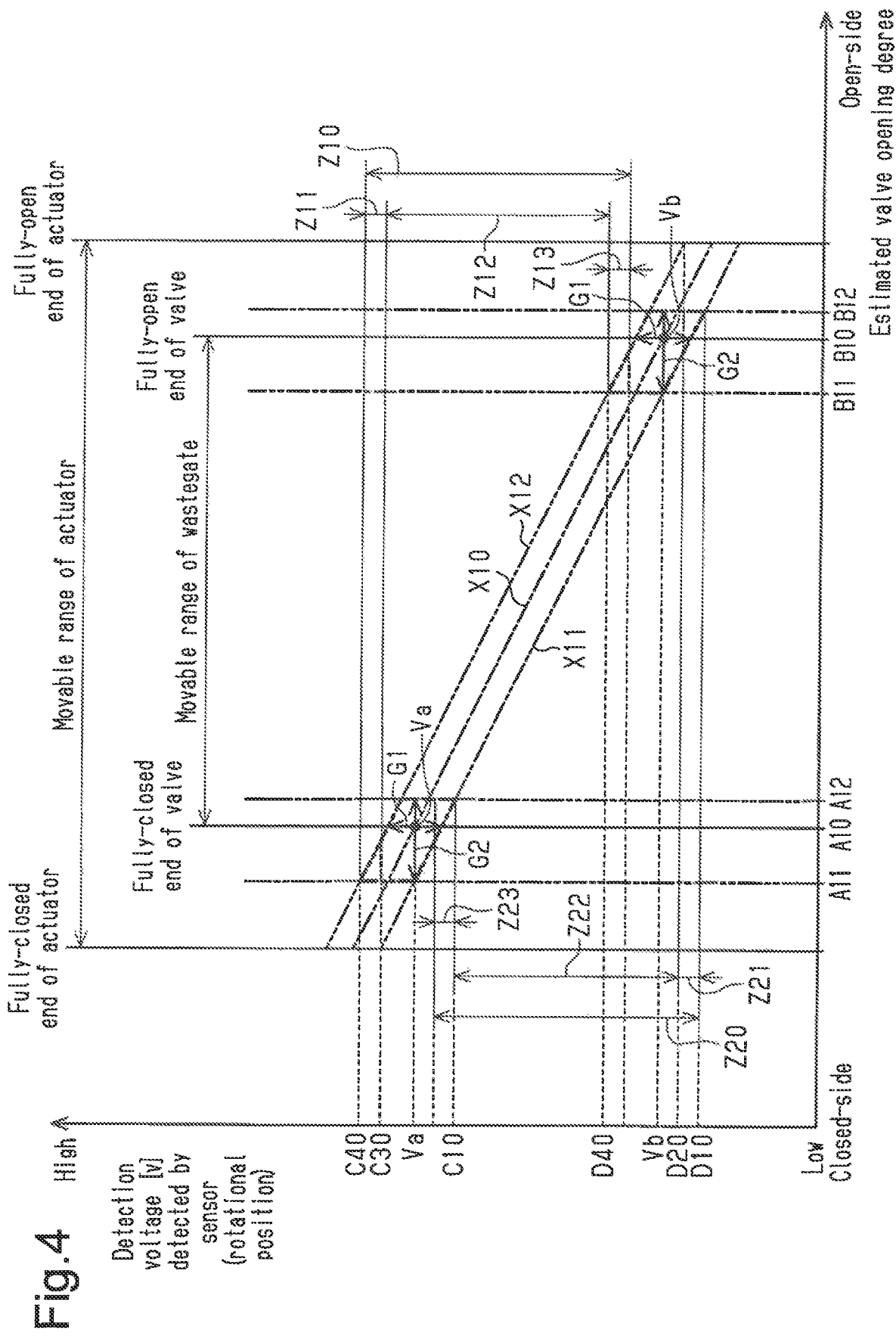
FIG. 4 is a graph of movable ranges of the wastegate and the actuator.

As described above, as the wastegate 40 approaches the closed position, the detection voltage S1 detected by the sensor 71 becomes higher. In contrast, as the wastegate 40 approaches the open position, the detection voltage S1 detected by the sensor 71 becomes lower. It is now assumed that an ideal state is defined as a state where neither thermal expansion nor wear occurs in the turbine housing 30, the wastegate 40, the link mechanism 50, and the like, the sensor 71 operates according to the specification, and thus no variation is found in the detection voltage S1. As shown in FIG. 4, in the ideal state, the detection voltage S1 detected by the sensor 71 at a valve opening degree A10 when the wastegate 40 is fully closed is defined as a closed-side ideal voltage Va. Similarly, the detection voltage S1 detected by the sensor 71 at a valve opening degree B10 when the wastegate 40 is fully open is defined as an open-side ideal voltage Vb. In the ideal state, as the opening degree of the wastegate 40 is increased depending on a change in the rotational position of the output gear 61, the detection voltage S1 is linearly reduced from the closed-side ideal voltage Va to the open-side ideal voltage Vb, as indicated by a straight line X10 in FIG. 4.

Even with the same opening degree of the wastegate 40, the detection voltage S1 may vary from the closed-side ideal voltage Va toward the high-voltage side or the low-voltage side, as indicated by arrows G1 in FIG. 4, due to individual differences of the sensor 71 and changes in the characteristics of the sensor 71 by temperature changes or the like. In addition, when thermal expansion or wear occurs in the turbine housing 30, the wastegate 40, the link mechanism 50, and the like, the opening degree of the wastegate 40 may vary as indicated by arrows G2 in FIG. 4, even with the same detection voltage S1 detected by the sensor 71. In view of variations in the detection voltage S1 detected by the sensor 71 and in the opening degree of the wastegate 40, the detection voltage S1 when the wastegate 40 is fully closed varies, at maximum, in the range between a voltage C10 lower than the closed-side ideal voltage Va in the ideal state and a voltage C40 higher than the closed-side ideal voltage Va. Similarly, the detection voltage S1 when the wastegate 40 is fully open varies, at maximum, in the range between a voltage D10 lower than the open-side ideal voltage Vb and a voltage D40 higher than the open-side ideal voltage Vb.

Next, a description is given of an anomaly determination process that is performed by the controller 90 to determine whether an anomaly is present in the mechanical connections of the wastegate 40, the link mechanism 50, and the actuator 60. The controller 90 repeatedly executes the anomaly determination process within a trip from start to end of drive of the internal combustion engine 100. When one of normality and anomaly is found in the anomaly determination process, the anomaly determination process is not repeatedly executed any more within that trip.

Figure 5:
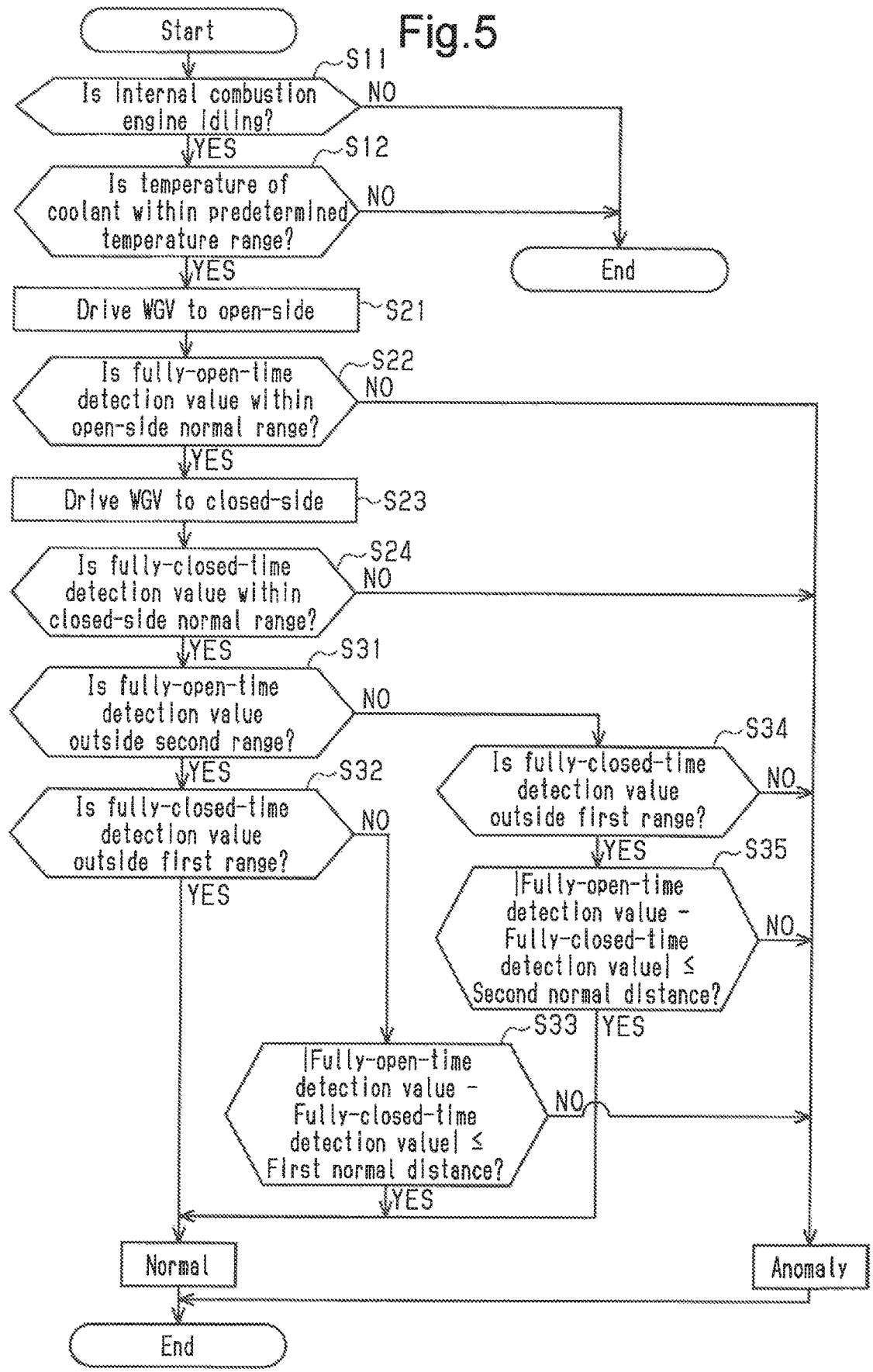
FIG. 5 is a flowchart of an anomaly determination process.

As shown in FIG. 5, the anomaly determination unit 92 determines whether the internal combustion engine 100 is idling at step S11. For example, the anomaly determination unit 92 determines that the internal combustion engine 100 is idling on condition that the rotational speed of the crankshaft of the internal combustion engine 100 is 600 rpm to 800 rpm and the depressing amount of the accelerator pedal is zero. When the internal combustion engine 100 is not idling (NO at S11), the anomaly determination unit 92 terminates the anomaly determination process. In this case, neither normality nor anomaly is determined, and thus the anomaly determination unit 92 executes the process at S11 again. In contrast, when the internal combustion engine 100 is idling (YES at S11), the anomaly determination unit 92 causes the process to proceed to step S12.

The anomaly determination unit 92 determines at step S12 whether the temperature of coolant of the internal combustion engine 100 is within a predetermined temperature range (for example, within the range of 70° C. or higher). When the temperature of coolant of the internal combustion engine 100 is not within the predetermined temperature range (NO at S12), the anomaly determination unit 92 terminates the anomaly determination process. In this case, neither normality nor anomaly is determined, and thus the anomaly determination unit 92 executes the processes at S11 and S12 again. In contrast, when the temperature of coolant of the internal combustion engine 100 is within the predetermined temperature range (YES at S12), the anomaly determination unit 92 causes the process to proceed to step S21.

The control unit 91 drives the wastegate (WGV) 40 to the open position at step S21. The anomaly determination unit 92 stores the detection voltage S1, which is detected by the sensor 71, when kept at a fixed value during a predetermined period of time as a fully-open-time detection value. When the detection voltage S1 is kept at a fixed value, the wastegate 40 abuts against the stopper 37 or the open-side stopper 61b abuts against the internal stopper 65 and thus the output gear 61 cannot rotate any more. The detection voltage S1 at that time is thus stored as the fully-open-time detection value. The anomaly determination unit 92 then causes the process to proceed to step S22.

The anomaly determination unit 92 determines at step S22 whether the fully-open-time detection value is within an open-side normal range. The open-side normal range is the possible range of the detection voltage S1 detected by the sensor 71 when the bypass passage 33 is fully open by the wastegate 40. As shown in FIG. 4, the open-side normal range is a range between a voltage D10, which is an open-side boundary value of the open-side normal range, and a voltage D40, which is a closed-side boundary value of the open-side normal range. The values of the voltages D10 and D40 are calculated by prior tests, simulations, and the like.

As shown in FIG. 5, when the fully-open-time detection value is not within the open-side normal range (NO at S22), the anomaly determination unit 92 determines that an anomaly is present in the mechanical connections of the link mechanism 50 and the like. The anomaly determination unit 92 then terminates a series of the processes. In contrast, when the fully-open-time detection value is within the open-side normal range (YES at S22), the anomaly determination unit 92 causes the process to proceed to step S23.

The control unit 91 drives the wastegate (WGV) 40 to the closed position at step S23. The anomaly determination unit 92 stores the detection voltage S1, which is detected by the sensor 71, when kept at a fixed value during a predetermined period of time as a fully-closed-time detection value. When the detection voltage S1 is kept at a fixed value, the wastegate 40 abuts against the valve seat 36 or the closed-side stopper 61a abuts against the internal stopper 65 and thus the output gear 61 cannot rotate any more. The detection voltage S1 at that time is thus stored as the fully-closed-time detection value. The anomaly determination unit 92 then causes the process to proceed to step S24.

The anomaly determination unit 92 determines at step S24 whether the fully-closed-time detection value is within a closed-side normal range. The closed-side normal range is the possible range of the detection voltage S1 detected by the sensor 71 when the bypass passage 33 is fully closed by the wastegate 40. As shown in FIG. 4, the closed-side normal range is a range between the voltage C10 that is an open-side boundary value of the closed-side normal range and the voltage C40 that is a closed-side boundary value of the closed-side normal range. The values of the voltages C10 and C40 are calculated by prior tests, simulations, and the like.

As shown in FIG. 5, when the fully-closed-time detection value is not within the closed-side normal range (NO at S24), the anomaly determination unit 92 determines that an anomaly is present in the mechanical connections of the link mechanism 50 and the like. The anomaly determination unit 92 then terminates a series of the processes. In contrast, when the fully-closed-time detection value is within the closed-side normal range (YES at S24), the anomaly determination unit 92 causes the process to proceed to step S31. In the present embodiments, the processes at steps S21 to S24 are included in a first anomaly determination process. In the present embodiment, even if no anomaly is found in the processes at steps S21 to S24, processes at step S31 and subsequent steps are executed.

The anomaly determination unit 92 determines at step S31 whether the fully-open-time detection value is outside a second range Z21 in the open-side normal range. As shown in FIG. 4, the second range Z21 in the open-side normal range is a range between the voltage D10, which is the open-side boundary value of the open-side normal range, and a voltage D20, which is a second threshold set in the open-side normal range. The voltage D20 is determined based on the detection voltage S1 that is possibly detected by the sensor 71 if the open-side stopper 61b of the output gear 61 abuts against the internal stopper 65. The voltage D20 is the highest detection voltage S11 when the open-side stopper 61b abuts against the internal stopper 65 and the detection voltage S1 varies. As shown in FIG. 5, when the fully-open-time detection value is outside the second range Z21 in the open-side normal range (YES at S31), the anomaly determination unit 92 causes the process to proceed to step S32.

The anomaly determination unit 92 determines at step S32 whether the fully-closed-time detection value is outside a first range Z11 in the closed-side normal range. As shown in FIG. 4, the first range Z11 in the closed-side normal range is a range between a voltage C30, which is a first threshold set in the closed-side normal range, and the voltage C40, which is the closed-side boundary value of the closed-side normal range. The voltage C30 is determined based on the detection voltage S1 that is possibly detected by the sensor 71 if the closed-side stopper 61a of the output gear 61 abuts against the internal stopper 65. The voltage C30 is the lowest detection voltage S11 when the closed-side stopper 61a abuts against the internal stopper 65 and the detection voltage S1 varies. As shown in FIG. 5, when the fully-closed-time detection value is outside the first range Z11 in the closed-side normal range (YES at S32), the anomaly determination unit 92 determines that no anomaly is present in the mechanical connections of the link mechanism 50 and the like, that is, the mechanical connections are normal. The anomaly determination unit 92 then terminates a series of the processes.

In contrast, when the fully-closed-time detection value is within the first range Z11 in the closed-side normal range (NO at S32), the anomaly determination unit 92 causes the process to proceed to step S33.

The anomaly determination unit 92 determines at step S33 whether the absolute value of the difference between the fully-closed-time detection value and the fully-open-time detection value is less than or equal to a first normal distance Z10. As shown in FIG. 4, the first normal distance Z10 is the sum of the distance twice the first range Z11 and a distance Z12 between the voltage D40, which is the closed-side boundary value of the open-side normal range, and the voltage C30, which is the first threshold set in the closed-side normal range. That is, the anomaly determination unit 92 determines in the process at step S33 whether the fully-closed-time detection value is within the first range Z11 having a higher voltage in the closed-side normal range and the fully-open-time detection value is within a first corresponding range Z13 having a higher voltage in the open-side normal range.

As shown in FIG. 5, when the absolute value of the difference between the fully-closed-time detection value and the fully-open-time detection value is less than or equal to the first normal distance Z10 (YES at S33), the anomaly determination unit 92 determines that no anomaly is present in the mechanical connections of the link mechanism 50 and the like, that is, the mechanical connections are normal. The anomaly determination unit 92 then terminates a series of the processes. In contrast, when the absolute value of the difference between the fully-closed-time detection value and the fully-open-time detection value is not less than or equal to the first normal distance Z10 (NO at S33), the difference between the fully-open-time detection value and the fully-closed-time detection value is outside the normal distance range, and thus the anomaly determination unit 92 determines that an anomaly is present in the mechanical connections of the link mechanism 50 and the like. The anomaly determination unit 92 then terminates a series of the processes.

In contrast, when the fully-open-time detection value is within the second range Z21 in the open-side normal range (NO at S31), the anomaly determination unit 92 causes the process to proceed to step S34.

The anomaly determination unit 92 determines at step S34 whether the fully-closed-time detection value is outside the first range Z11 in the closed-side normal range. When the fully-closed-time detection value is within the first range Z11 in the closed-side normal range (NO at S34), the anomaly determination unit 92 determines that an anomaly is present in the mechanical connections of the link mechanism 50 and the like. The anomaly determination unit 92 then terminates a series of the processes. In contrast, when the fully-closed-time detection value is outside the first range Z11 in the closed-side normal range (YES at S34), the anomaly determination unit 92 causes the process to proceed to step S35.

The anomaly determination unit 92 determines at step S35 whether the absolute value of the difference between the fully-closed-time detection value and the fully-open-time detection value is less than or equal to a second normal distance Z20. As shown in FIG. 4, the second normal distance Z20 is the sum of the distance twice the second range Z21 and a distance Z22 between the voltage D20, which is the second threshold set in the open-side normal range, and the voltage C10, which is the open-side boundary value of the closed-side normal range. That is, the anomaly determination unit 92 determines in the process at step S35 whether the fully-open-time detection value is within the second range Z21 having a lower voltage in the open-side normal range and the fully-closed-time detection value is within a second corresponding range Z23 having a lower voltage in the closed-side normal range.

As shown in FIG. 5, when the absolute value of the difference between the fully-closed-time detection value and the fully-open-time detection value is less than or equal to the second normal distance Z20 (YES at S35), the anomaly determination unit 92 determines that no anomaly is present in the mechanical connections of the link mechanism 50 and the like, that is, the mechanical connections are normal. The anomaly determination unit 92 then terminates a series of the processes. In contrast, when the absolute value of the difference between the fully-closed-time detection value and the fully-open-time detection value is not less than or equal to the second normal distance Z20 (NO at S35), the difference between the fully-open-time detection value and the fully-closed-time detection value is outside the normal distance range, and thus the anomaly determination unit 92 determines that an anomaly is present in the mechanical connections of the link mechanism 50 and the like. The anomaly determination unit 92 then terminates a series of the processes. The processes at steps S33 to S35 are included in a second anomaly determination process.

The operation and advantages of the present embodiment will now be described.

Some coupling structures of the wastegate 40, the link mechanism 50, and the actuator 60 may be disconnected, so that an anomaly occurs in the mechanical connections. When an anomaly is present in the mechanical connections of the link mechanism 50 and the like as described above, rotation of the output gear 61 is no longer restricted. As a result, the movable range of the output gear 61 when an anomaly is present in the mechanical connections of the link mechanism 50 and the like is larger than that when the mechanical connections are normal.

The controller 90 determines, in a first anomaly determination process, whether a fully-open-time detection value is within an open-side normal range and whether a fully-closed-time detection value is within a closed-side normal range. It is thus possible to determine whether the movable range of the output gear 61 is excessively larger than that when the mechanical connections of the link mechanism 50 and the like are normal, thus determining whether an anomaly is present in the mechanical connections of the link mechanism 50 and the like.

As shown in FIG. 4, when the fully-closed-time detection value is within the first range Z11 in the closed-side normal range, the range of the detection voltage S1 possibly detected when the mechanical connections of the link mechanism 50 and the like are normal overlaps the range of the detection voltage S1 possibly detected when an anomaly is present the mechanical connections of the link mechanism 50 and the like. Specifically, the range of the detection voltage S1 detected reflecting variations when the mechanical connections of the link mechanism 50 and the like are normal overlaps the range of the detection voltage S1 detected by the sensor 71 when the closed-side stopper 61a of the output gear 61 abuts against the internal stopper 65. When the fully-open-time detection value is within the second range Z21 in the open-side normal range, the range of the detection voltage S1 possibly detected when the mechanical connections of the link mechanism 50 and the like are normal overlaps the range of the detection voltage S1 possibly detected when an anomaly is present the mechanical connections of the link mechanism 50 and the like. Specifically, the range of the detection voltage S1 possibly detected reflecting variations when the mechanical connections of the link mechanism 50 and the like are normal overlaps the range of the detection voltage S1 possibly detected by the sensor 71 when the open-side stopper 61b of the output gear 61 abuts against the internal stopper 65. In these cases, when whether an anomaly is present in the mechanical connections of the link mechanism 50 and the like is determined only by the first anomaly determination process, it may be determined by mistake that an anomaly is present although the mechanical connections of the link mechanism 50 and the like are normal, or it may be determined by mistake to be normal although an anomaly is present in the mechanical connections of the link mechanism 50 and the like.

To handle such a case, the controller 90 causes, in the second anomaly determination process, the process to proceed to step S33 when the fully-closed-time detection value is within the first range Z11 in the closed-side normal range, and determines whether the absolute value of the difference between the fully-closed-time detection value and the fully-open-time detection value is less than or equal to the first normal distance Z10. When the absolute value of the difference between the fully-closed-time detection value and the fully-open-time detection value is not less than or equal to the first normal distance Z10, the controller 90 determines that the fully-closed-time detection value is within the first range Z11 having a higher voltage in the closed-side normal range and the fully-open-time detection value is not within the first corresponding range Z13 having a higher voltage in the open-side normal range. When the mechanical connections of the link mechanism 50 and the like are normal, even if thermal expansion or wear occurs in the link mechanism 50 and the like or detection error is found in the sensor 71, a change in the detection voltage S1, that is, a variation in detection of the sensor 71 is likely to have a similar tendency for both the fully-opened-time detection value and the fully-closed-time detection value. This is because the identical sensor 71 detects both the fully-opened-time detection value and the fully-closed-time detection value. In addition, it is also because the fully-opened-time detection value and the fully-closed-time detection value are subsequently detected, and thus the state of the sensor 71 hardly changes over time and the state of thermal expansion or wear in the turbine housing 30, the wastegate 40, the link mechanism 50, and the like also hardly changes over time.

For this reason, in a case where the mechanical connections of the link mechanism 50 and the like are normal, when the fully-closed-time detection value is within the first range Z11, which has a higher voltage in the closed-side normal range, the fully-open-time detection value is within the first corresponding range Z13, which has a higher voltage in the open-side normal range. In contrast, in a case where an anomaly is present in the mechanical connections of the link mechanism 50 and the like, when the fully-closed-time detection value is within the first range Z11, which has a higher voltage in the closed-side normal range, the fully-open-time detection value is not within the first corresponding range Z13, which has a higher voltage in the open-side normal range. When the absolute value of the difference between the fully-closed-time detection value and the fully-open-time detection value is not less than or equal to the first normal distance Z10, the controller 90 determines in the second anomaly determination process that the movable range of the output gear 61 is large and an anomaly is present in the mechanical connections of the link mechanism 50 and the like. Consequently, even when the fully-closed-time detection value is within the first range Z11 in the closed-side normal range, a wrong determination of the mechanical connections of the link mechanism 50 and the like is prevented. It is thus possible to achieve an anomaly determination process more accurately.

In the second anomaly determination process, the controller 90 causes the process to proceed to step S35 when the fully-open-time detection value is within the second range Z21 in the open-side normal range, and determines whether the absolute value of the difference between the fully-closed-time detection value and the fully-open-time detection value is less than or equal to the second normal distance Z20. When the absolute value of the difference between the fully-closed-time detection value and the fully-open-time detection value is not less than or equal to the second normal distance Z20, the controller 90 determines that the fully-open-time detection value is within the second range Z21 having a lower voltage in the open-side normal range and the fully-closed-time detection value is not within the second corresponding range Z23 having a lower voltage in the closed-side normal range. When the absolute value of the difference between the fully-closed-time detection value and the fully-open-time detection value is not less than or equal to the second normal distance Z20, the controller 90 determines in the second anomaly determination process that the movable range of the output gear 61 is large and an anomaly is present in the mechanical connections of the link mechanism 50 and the like. Consequently, even when the fully-open-time detection value is within the second range Z21 in the open-side normal side, a wrong determination of the mechanical connections of the link mechanism 50 and the like is prevented. It is thus possible to achieve an anomaly determination process more accurately.

As shown in FIG. 4, when the fully-closed-time detection value is within the closed-side normal range but outside the first range Z11, the range of the detection voltage S1 possibly detected when the mechanical connections of the link mechanism 50 and the like are normal does not overlap the range of the detection voltage S1 possibly detected when the closed-side stopper 61a of the output gear 61 abuts against the internal stopper 65. In addition, when the fully-open-time detection value is within the open-side normal range but outside the second range Z21, the range of the detection voltage S1 possibly detected when the mechanical connections of the link mechanism 50 and the like are normal does not overlap the range of the detection voltage S1 possibly detected when the open-side stopper 61b of the output gear 61 abuts against the internal stopper 65. In the present embodiment, when two conditions are met that are a condition that the fully-closed-time detection value is within the closed-side normal range but outside the first range Z11 and a condition that time the fully-open-time detection value is within the open-side normal range but outside the second range Z21, the controller 90 does not execute the second anomaly determination process and determines that the mechanical connections of the link mechanism 50 and the like are normal. That is, in the present embodiment, the controller 90 executes the second anomaly determination process only when a wrong determination of the mechanical connections of the link mechanism 50 and the like is easily made. It is thus possible to reduce a processing load of the anomaly determination process on the controller 90 when no anomaly is present in the mechanical connections of the link mechanism 50 and the like.

As shown in FIG. 4, when two conditions are met that are a condition that the fully-closed-time detection value is within the closed-side normal range and the first range Z11 and a condition that the fully-open-time detection value is within the open-side normal range and the second range Z21, the movable range of the output gear 61 is large. In the present embodiment, when these conditions are met, the controller 90 does not execute the processes at steps S33 and S35 and determines that an anomaly is present in the mechanical connections of the link mechanism 50 and the like. In the present embodiment, when these conditions are met, the controller 90 does not calculate the difference between the fully-open-time detection value and the fully-closed-time detection value. Moreover, the controller 90 does not compare the difference between the fully-open-time detection value and the fully-closed-time detection value to the first normal distance Z10 or the second normal distance Z20. It is thus possible to reduce the processing load of the anomaly determination process on the controller 90.

The controller 90 executes the first anomaly determination process and the second anomaly determination process when the internal combustion engine 100 is idling. Vibration of the wastegate 40 due to pulsation of exhaust gas can thus be relatively reduced during the first anomaly determination process and the second anomaly determination process as compared to a case where the internal combustion engine 100 is not idling. It is thus possible to prevent a variation in the detection voltage S1 detected by the sensor 71 due to the vibration of the wastegate 40. In addition, the controller 90 executes the first anomaly determination process and the second anomaly determination process when the temperature of coolant of the internal combustion engine 100 is within a predetermined temperature range. It is thus possible to prevent a variation in the detection voltage S1 detected by the sensor 71 due to a temperature change in the internal combustion engine 100 or the like. Consequently, it is possible to further improve the precision of the anomaly determination process.

The present embodiment may be modified as follows. The present embodiment and the following modifications can be combined as long as the combined modifications remain technically consistent with each other.

One of the process at step S22 and the process at step S24 in the first anomaly determination process may be omitted. In this case, it is determined in the subsequent second anomaly determination process, for example, whether the absolute value of the difference between the fully-closed-time detection value and the fully-open-time detection value is larger than or equal to a third normal distance, in addition to the processes at steps S33 to S35. As shown in FIG. 4, the third normal distance is a distance between the voltage D40, which is the closed-side boundary value of the open-side normal range, and the voltage C10, which is the open-side boundary value of the closed-side normal range. When the difference between the fully-open-time detection value and the fully-closed-time detection value is not larger than or equal to the third normal distance, the difference between the fully-open-time detection value and the fully-closed-time detection value is outside the normal distance range.

The processes at steps S31, S32, and S34 may be omitted. That is, whenever it is determined in the first anomaly determination process that no anomaly is present in the mechanical connections of the link mechanism 50 and the like, the second anomaly determination process may be executed.

When two conditions are met that are a condition that the fully-closed-time detection value is within the closed-side normal range but outside the first range Z11 and a condition that the fully-open-time detection value is within the open-side normal range but outside the second range Z21, the second anomaly determination process may be executed.

When two conditions are met that are a condition that the fully-closed-time detection value is within the closed-side normal range and the first range Z11 and a condition that the fully-open-time detection value is within the open-side normal range and the second range Z21, the processes at step S33 and S35 may be executed.

The first anomaly determination process and the second anomaly determination process may be executed when it is determined that the internal combustion engine 100 is not idling. If the vibration of the wastegate 40 due to the pulsation of exhaust gas is relatively reduced when the internal combustion engine 100 is not idling, a variation in the detection voltage S1 detected by the sensor 71 is small.

The predetermined temperature range at step S12 may be changed as necessary. The first anomaly determination process and the second anomaly determination process may be executed regardless of the temperature of coolant of the internal combustion engine 100. For example, when a variation in the detection voltage S1 detected by the sensor 71 due to a temperature change in the internal combustion engine 100 or the like is small, the first anomaly determination process and the second anomaly determination process may be executed even if the temperature of coolant of the internal combustion engine 100 is not within the predetermined temperature range.

The first normal distance Z10 at step S33 may be changed as necessary. Specifically, the first normal distance Z10 may be changed within a range larger than the distance Z12 between the voltage D40, which is the closed-side boundary value of the open-side normal range, and the voltage C30, which is the first threshold set in the closed-side normal range, and smaller than the distance between the voltage D10, which is the open-side boundary value of the open-side normal range, and the voltage C30, which is the first threshold set in the closed-side normal range. In this case, the first normal distance Z10 may be set to a value that can adequately prevent a wrong determination by experiments and simulations.

The second normal distance Z20 at step S35 may also be changed as necessary. Specifically, the second normal distance Z20 may be changed within a range that is larger than the distance Z22 between the voltage D20, which is the second threshold set in the open-side normal range, and the voltage C10, which is the open-side boundary value of the closed-side normal range, and smaller than the distance between the voltage D20, which is the second threshold set in the open-side normal range, and the voltage C40, which is the closed-side boundary value of the closed-side normal range.

The first range Z11 in the closed-side normal range may be changed as necessary within the closed-side normal range. For example, the first range Z11 in the closed-side normal range may be between a first threshold and the voltage C40, which is the closed-side boundary value of the closed-side normal range. The first threshold is higher than the voltage C10, which is the open-side boundary value of the closed-side normal range, and is lower than the voltage C40, which is the closed-side boundary value of the closed-side normal range. Also in this case, it is possible to prevent a wrong determination of the mechanical connections of the link mechanism 50 and the like as compared to a case of determining whether an anomaly is present in the mechanical connections of the link mechanism 50 and the like only by the first anomaly determination process.

The second range Z21 in the open-side normal range may be changed as necessary within the open-side normal range. For example, the second range Z21 may be between the voltage D10, which is the open-side boundary value of the open-side normal range, and a second threshold. The second threshold is higher than the voltage D10, which is the open-side boundary value of the open-side normal range, and is lower than the voltage D40, which is the closed-side boundary value of the open-side normal range.

The position of the stopper 37, which restricts the movement of the wastegate 40 toward the open position may be changed as necessary. For example, the stopper may project from the outer wall surface of the turbine housing 30. It may be configured that the stopper abuts against some link members 51 constituting the link mechanism 50 for the purpose of restricting the movement of the wastegate 40 toward the open position.

The coupling mechanism connecting the wastegate 40 to the actuator 60 is not limited to the link mechanism 50. For example, the coupling mechanism may be a gear to which the wastegate 40 and the actuator 60 are coupled.

It is permissible to use a sensor configured to detect a lower voltage as the rotational position of the output gear 61 approaches the rotational position corresponding to the closed position of the wastegate 40 and to detect a higher voltage as the rotational position of the output gear 61 approaches the rotational position corresponding to the open position of the wastegate 40.

It is permissible to use a sensor configured to detect pulse signals with different phases based on rotation of the output gear 61.

The invention claimed is:
1. An anomaly determination device for use with a turbocharger, wherein
the turbocharger includes
a turbine housing, which includes
a scroll passage, in which a turbine wheel configured to be rotated by exhaust gas is housed,
a discharge passage, which is connected to the scroll passage and in which exhaust gas from the scroll passage flows, and
a bypass passage, which connects a section of the scroll passage upstream of the turbine wheel to the discharge passage, a wastegate, which abuts against a valve seat provided in the turbine housing when the bypass passage is fully closed;

an electric actuator configured to drive the wastegate;

a coupling mechanism, which couples the wastegate to the actuator;

a stopper, which abuts against the wastegate or the coupling mechanism when the bypass passage is fully open to restrict a movement of the wastegate to an open position;

a sensor, which detects a position of an output shaft of the actuator;

a control unit, which controls energization of the actuator; and an anomaly determination unit, which determines whether an anomaly is present in the coupling mechanism based on a detection value detected by the sensor, the anomaly determination unit is configured to execute a first anomaly determination process for determining that an anomaly is present in the coupling mechanism when at least one of first and second conditions is met, the first condition being that a fully-closed-time detection value is outside a closed-side normal range set in advance and the second condition being that an fully-open-time detection value is outside an open-side normal range set in advance, and a second anomaly determination process for determining that an anomaly is present in the coupling mechanism if a difference between the fully-closed-time detection value and the fully-open-time detection value is outside a normal distance range set in advance when it is not determined in the first anomaly determination process that an anomaly is present in the coupling mechanism, the fully-closed-time detection value is a detection value of the sensor when the control unit energizes the actuator to cause the wastegate to abut against the valve seat, and the fully-open-time detection value is a detection value of the sensor when the control unit energizes the actuator to cause the wastegate to abut against the stopper.

2. The anomaly determination device according to claim 1, wherein the anomaly determination unit is configured to execute the first anomaly determination process and the second anomaly determination process when an internal combustion engine is idling and a temperature of coolant of the internal combustion engine is within a predetermined temperature range.

3. The anomaly determination device according to claim 1, wherein the anomaly determination unit is configured to execute the second anomaly determination process when at least one of third and fourth conditions is met, the third condition being that the fully-closed-time detection value is a value between a first threshold set in the closed-side normal range and a closed-side boundary value of the closed-side normal range and the fourth condition being that the fully-open-time detection value is a value between a second threshold set in the open-side normal range and an open-side boundary value of the open-side normal range, and the anomaly determination unit is configured to determine that no anomaly is present in the coupling mechanism without executing the second anomaly determination process when fifth and sixth conditions are met, the fifth condition being that the fully-closed-time detection value is a value between the first threshold and an open-side boundary value of the closed-side normal range and the sixth condition being that the fully-open-time detection value is a value between the second threshold and a closed-side boundary value of the open-side normal range.

4. The anomaly determination device according to claim 1, wherein the anomaly determination unit is configured to determine in the second anomaly determination process that an anomaly is present in the coupling mechanism when third and fourth conditions are met, the third condition being that the fully-closed-time detection value is a value between a first threshold set in the closed-side normal range and a closed-side boundary value of the closed-side normal range and the fourth condition being that the fully-open-time detection value is a value between a second threshold set in the open-side normal range and an open-side boundary value of the open-side normal range.

5. An anomaly determination device for use with a turbocharger, wherein the turbocharger includes a turbine housing, which includes a scroll passage, in which a turbine wheel configured to be rotated by exhaust gas is housed, a discharge passage, which is connected to the scroll passage and in which exhaust gas from the scroll passage flows, and a bypass passage, which connects a section of the scroll passage upstream of the turbine wheel to the discharge passage, a wastegate, which abuts against a valve seat provided in the turbine housing when the bypass passage is fully closed;

an electric actuator configured to drive the wastegate;

a coupling mechanism, which couples the wastegate to the actuator;

a stopper, which abuts against the wastegate or the coupling mechanism when the bypass passage is fully open to restrict a movement of the wastegate to an open position;

a sensor, which detects a position of an output shaft of the actuator;

a control unit, which controls energization of the actuator; and an anomaly determination unit, which determines whether an anomaly is present in the coupling mechanism based on a detection value detected by the sensor, the anomaly determination unit includes circuitry that is configured to execute a first anomaly determination process for determining that an anomaly is present in the coupling mechanism when at least one of first and second conditions is met, the first condition being that a fully-closed-time detection value is outside a closed-side normal range set in advance and the second condition being that an fully-open-time detection value is outside an open-side normal range set in advance, and a second anomaly determination process for determining that an anomaly is present in the coupling mechanism if a difference between the fully-closed-time detection value and the fully-open-time detection value is outside a normal distance range set in advance when it is not determined in the first anomaly determination process that an anomaly is present in the coupling mechanism, the fully-closed-time detection value is a detection value of the sensor when the control unit energizes the actuator to cause the wastegate to abut against the valve seat, and the fully-open-time detection value is a detection value of the sensor when the control unit energizes the actuator to cause the wastegate to abut against the stopper.

6. An anomaly determination method for a turbocharger, wherein the turbocharger includes a turbine housing, which includes a scroll passage, in which a turbine wheel configured to be rotated by exhaust gas is housed, a discharge passage, which is connected to the scroll passage and in which exhaust gas from the scroll passage flows, and a bypass passage, which connects a section of the scroll passage upstream of the turbine wheel to the discharge passage, a wastegate, which abuts against a valve seat provided in the turbine housing when the bypass passage is fully closed;

an electric actuator configured to drive the wastegate;

a coupling mechanism, which couples the wastegate to the actuator;

a stopper, which abuts against the wastegate or the coupling mechanism when the bypass passage is fully open to restrict a movement of the wastegate to an open position;

a sensor, which detects a position of an output shaft of the actuator;

a control unit, which controls energization of the actuator; and an anomaly determination unit, which determines whether an anomaly is present in the coupling mechanism based on a detection value detected by the sensor, the anomaly determination method comprising:

executing, using the anomaly determination unit, a first anomaly determination process for determining that an anomaly is present in the coupling mechanism when at least one of first and second conditions is met, the first condition being that a fully-closed-time detection value is outside a closed-side normal range set in advance and the second condition being that an fully-open-time detection value is outside an open-side normal range set in advance; and executing, using the anomaly determination unit, a second anomaly determination process for determining that an anomaly is present in the coupling mechanism if a difference between the fully-closed-time detection value and the fully-open-time detection value is outside a normal distance range set in advance when it is not determined in the first anomaly determination process that an anomaly is present in the coupling mechanism, wherein the fully-closed-time detection value is a detection value of the sensor when the control unit energizes the actuator to cause the wastegate to abut against the valve seat, and the fully-open-time detection value is a detection value of the sensor when the control unit energizes the actuator to cause the wastegate to abut against the stopper.

* * * * *